(12) United States Patent
Poissant et al.

(10) Patent No.: US 7,837,072 B2
(45) Date of Patent: Nov. 23, 2010

(54) FLUSH MOUNTED SPIGOT ASSEMBLY

(75) Inventors: Philip L. Poissant, Toronto (CA); William Herbert Evans, St. Catharines (CA)

(73) Assignee: Global Vintners Inc., St. Catharines, ON (CA)

( * ) Notice: Subject to any disclaimer, the term of this patent is extended or adjusted under 35 U.S.C. 154(b) by 447 days.

(21) Appl. No.: 11/957,874

(22) Filed: Dec. 17, 2007

(65) Prior Publication Data

US 2009/0001105 A1  Jan. 1, 2009

Related U.S. Application Data

(60) Provisional application No. 60/875,181, filed on Dec. 15, 2006.

(51) Int. Cl.
B67D 3/00 (2006.01)
(52) U.S. Cl. ............ 222/505; 222/1; 222/507; 222/523; 222/548; 251/351
(58) Field of Classification Search ......... 222/505–507, 222/513, 516, 519, 522, 523, 548, 1; 251/310, 251/351
See application file for complete search history.

(56) References Cited

U.S. PATENT DOCUMENTS

| 675,548 | A | * | 6/1901 | Long .................. 222/505 |
| 1,859,126 | A | * | 5/1932 | Boeuf ................. 222/505 |
| 1,912,304 | A | * | 5/1933 | Phillips .............. 222/513 |
| 3,308,224 | A | | 3/1967 | Waddington et al. |
| 4,200,123 | A | | 4/1980 | Brandelli |
| 4,602,725 | A | | 7/1986 | Malpas et al. |
| 4,621,750 | A | * | 11/1986 | Roethel ............... 222/505 |
| 4,632,362 | A | | 12/1986 | Lucking |
| 4,997,108 | A | * | 3/1991 | Hata .................. 222/105 |
| D612,656 | S | * | 3/2010 | Poissant ............... D7/306 |

* cited by examiner

*Primary Examiner*—Frederick C. Nicolas
(74) *Attorney, Agent, or Firm*—Mark S. Leonardo; Brown Rudnick LLP

(57) ABSTRACT

A spigot assembly for use in a fermentation vessel, such as the type used in wine making, is provided. The spigot assembly is of a multiple part construction such that it substantially avoids entrapment of either sediment or air in or on the assembly as the spigot operates to remove liquid from the vessel.

7 Claims, 5 Drawing Sheets

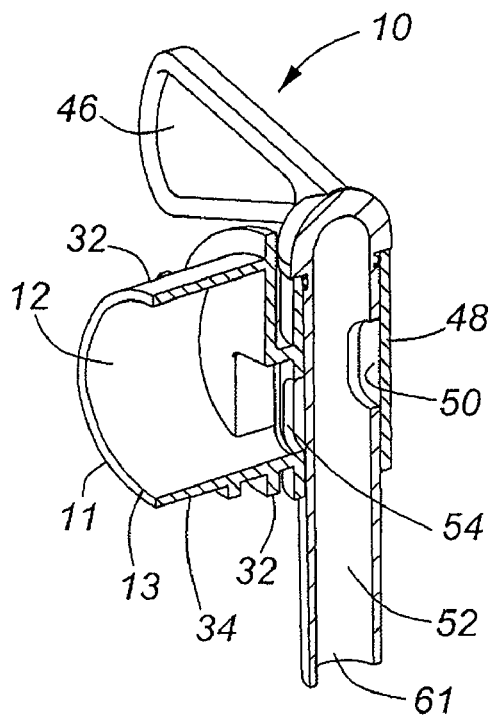
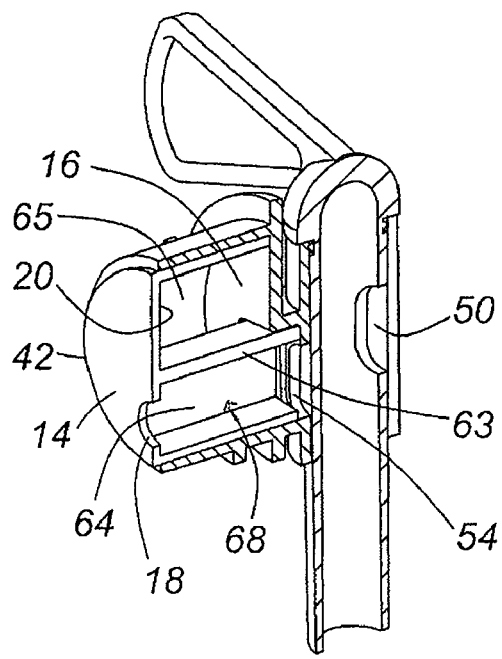
FIG. 10      FIG. 11
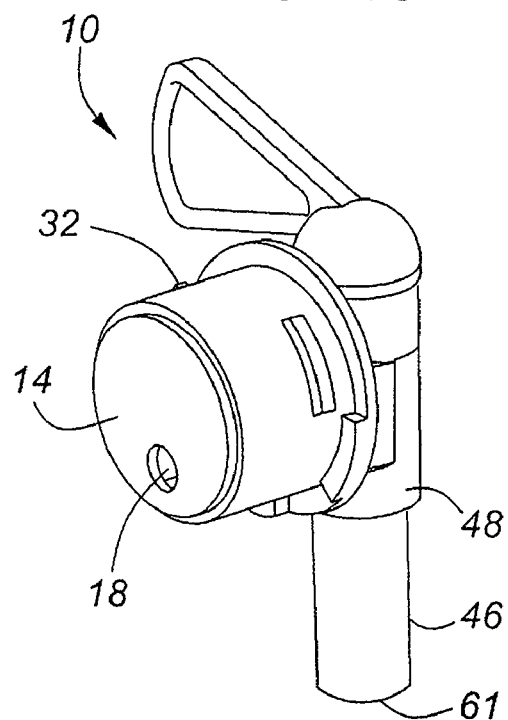
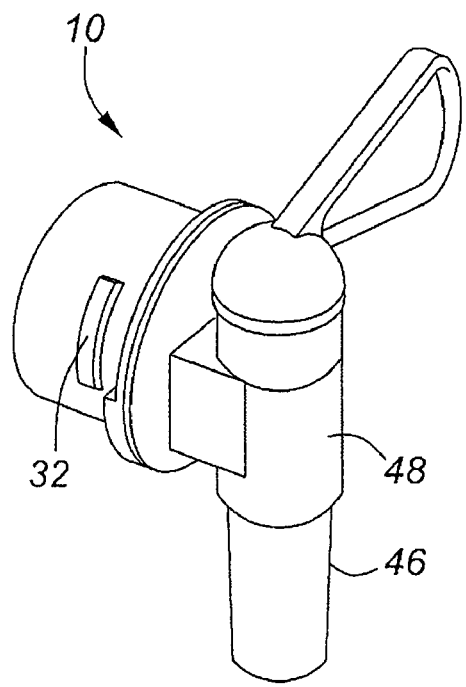
FIG. 12      FIG. 13

FLUSH MOUNTED SPIGOT ASSEMBLY

RELATED APPLICATION

This application claims the benefit under Title 35, U.S.C., S. 119(e) of U.S. provisional application No. 60/875,181 filed Dec. 15, 2006.

FIELD OF INVENTION

The present invention relates generally to spigot assemblies.

BACKGROUND OF INVENTION

Many types of spigot assemblies exist for emptying containers filled with liquid. Some devices arrange for the alignment of two or more holes in a spigot assembly in order to permit liquid to flow from the interior of the vessel to its exterior. Generally, the liquid fills a chamber of the spigot assembly until the spigot is activated to allow flow from the container. If the spigot assembly is located on the side of the vessel, air bubbles and sediment may then collect within the chamber of the spigot assembly. This may lead to blockage in the spigot assembly, or contamination or oxidation of the liquid.

This problem is particularly relevant for those brewing home wines, beer or other types of fermented beverages. Typically, a liquid such as grape juice or concentrate, or crushed grapes is poured into a container along with certain substances including yeast. As the liquid ferments, the yeast precipitates out of the liquid to form with other particles a sediment called "lees" or "mud", which settles to the bottom of the container. With typical spigot assemblies, some lees may be entrapped in open or on protruding parts of the assembly. When the spigot is opened, this entrapped lees will contaminate the wine.

Then, the liquid is then typically decanted from the container into a second container where typically a fining agent such as Bentonite is added, and further sediment precipitates out of the liquid. The final step when brewing homemade wine, beer or other fermented beverages is the bottling process.

The process of emptying the containers can be both messy and physically demanding. As well, undesired oxidization or "bruising" of the liquid may occur during this process if the liquid is handled roughly or is overly exposed to the air. Spigots are generally not used to empty containers during this process, as spigots generally would allow sediment into their chambers, or would trap air inside a horizontal chamber. It is therefore desirable to provide for an improved spigot design.

One spigot type assembly is shown in U.S. Pat. No. 1,381,598, which discloses a spigot which does not allow liquid from the container to flow through the spigot until a pair of openings are aligned at the end of the spigot. An automatic spring-loaded shutoff is also provided.

Another type of draw-off arrangement for liquid containers is provided in U.S. Pat. No. 1,815,501. This patent provides for a separate chamber between a container and a tap. Rotation of the tap into the spigot body uses interacting longitudinal ribs to rotate the spigot into an open position.

Another type of spigot device is disclosed in U.S. Pat. No. 3,302,660, which describes a tapping valve for a beer keg. The disclosed valve is designed for a pressurized container, and comprises a valve completely inserted into a keg. Is also has an interior valve space into which openings are aligned and uses a surface to surface seal when the opening is in a closed position.

Another example of a patent which provides for rotation of a spigot in a sleeve for alignment of outlet holes is provided in U.S. Pat. No. 4,632,362. The spigot fits tightly into the body member, but may be rotated to align the outlet holes in two cylindrical portions of the spigot, thereby opening or closing the tap. The outer surface of the inner cylindrical portion sealingly fits the inner surface of the outer cylindrical portion to prevent leakage, and is held in place by a ridge and groove design. Generally, the entire assembly is heat sealed to a container. As well, a plug is provided to fit into the outer end of the spigot, allowing the container to be filled through the opening.

SUMMARY OF INVENTION

An object of the invention is to provide a spigot assembly for a container which assembly substantially avoids entrapment of either sediment or air in or on the assembly.

In one embodiment of the spigot assembly, there is provided a first spigot assembly, an inner molding and an outer cylinder.

The first spigot assembly may be injection molded from plastic. The first spigot assembly comprises an open ended cylinder having a protruding second hollow cylinder having an open end defining a chamber. The spigot assembly also comprises a rotator part capable of insertion into the open ended cylinder and has an inlet capable of communicating with the outlet of the chamber. The rotator part is capable of rotating within the open ended cylinder bringing the inlet and outlet into alignment and out of alignment. The rotator part also has an outlet, thereby allowing fluid to flow from the outlet in the chamber, into the inlet in the rotator part and out the outlet of the rotator part.

The inner molding is in the form of a cylinder closed at one end and sized to fit tightly within the chamber. The closed end is provided a first small opening, providing the only inlet into the chamber. There is also provided a wall above the first small opening which reduces the volume within the chamber. There is also provided an outlet which allows the chamber to communicate with the open ended cylinder. The wall is configured to form a passageway between the first small opening the outlet.

The outer cylinder comprises a cylinder sized to receive the first spigot assembly, and substantially closed at one end. The substantially closed end is provided a second small opening. A seal is also provided which surrounds the second small opening. Also provided on the interior wall of the cylinder are keyways extending from the open end and ending at a rotation track. These keyways correspond with projections on the exterior wall of the chamber.

The substantially closed end of the outer cylinder is capable of insertion into a suitable container, such that it is mounted flush with the interior surface of the container and such that no leakage occurs around the outer cylinder.

According to a second preferred embodiment of the present invention, the first spigot assembly is made from two separate components, a tap structure, and an inner molding.

The tap structure comprises an open ended cylinder having a protruding second cylinder part having an open end defining a chamber and an outlet from the closed end of the cylinder communicating with the interior of the open ended cylinder. The tap structure also comprises a rotator part capable of insertion into the open ended cylinder and having an inlet capable of communicating with the outlet of the chamber. The rotator part is capable of rotating within the open ended cylinder bringing the inlet and outlet into alignment and out of alignment.

The inner molding is open at one end, and has a small opening at a closed end. The inner molding is capable of insertion into the chamber of the tap assembly so that the small inner molding's closed end partially seals the tap assembly. The inner molding and tap assembly may be friction fitted together along keyways provided for this purpose, in either case, the insertion forms a spigot assembly. The tap structure is now closed at its outer end by the closed end of the inner molding. The first small opening provides the only inlet to the chamber formed by the combination of the tap structure and the inner molding.

In either embodiment, the spigot assembly must then be inserted into the outer cylinder. As an initial insertion step, the spigot assembly is inserted into the outer cylinder, so that the first small opening is out of alignment with the second small opening.

Next, the spigot assembly is rotated so that that the projections in the track locks the spigot assembly into the outer cylinder. At this time, the seal associated with the second small opening is compressed, preventing any flow or leakage from the interior of the container to the chamber.

To begin flow of liquid out of the container, the spigot assembly is rotated until it is in an upright position and the first and second small openings are aligned. This allows the flow of liquid into the chamber. Now, the rotator part may be rotated to align its opening with the outlet of the chamber. This allows liquid to flow from the chamber and out the end of the tap assembly.

BRIEF DESCRIPTION OF THE DRAWINGS

These and other advantages of the present invention will become apparent upon reading the following detailed description and upon referring to the drawings in which:

FIG. 10 is a cutaway perspective view of the tap assembly and an associated housing part;

FIG. 11 is a cutaway perspective view of the top assembly and a further housing part;

FIG. 12 is a perspective rear view of the partially assembled spigot assembly of FIG. 11;

FIG. 13 is a perspective front view of the partially assembled spigot assembly of FIG. 11.

DETAILED DESCRIPTION OF THE PREFERRED EMBODIMENTS

Figure 1:
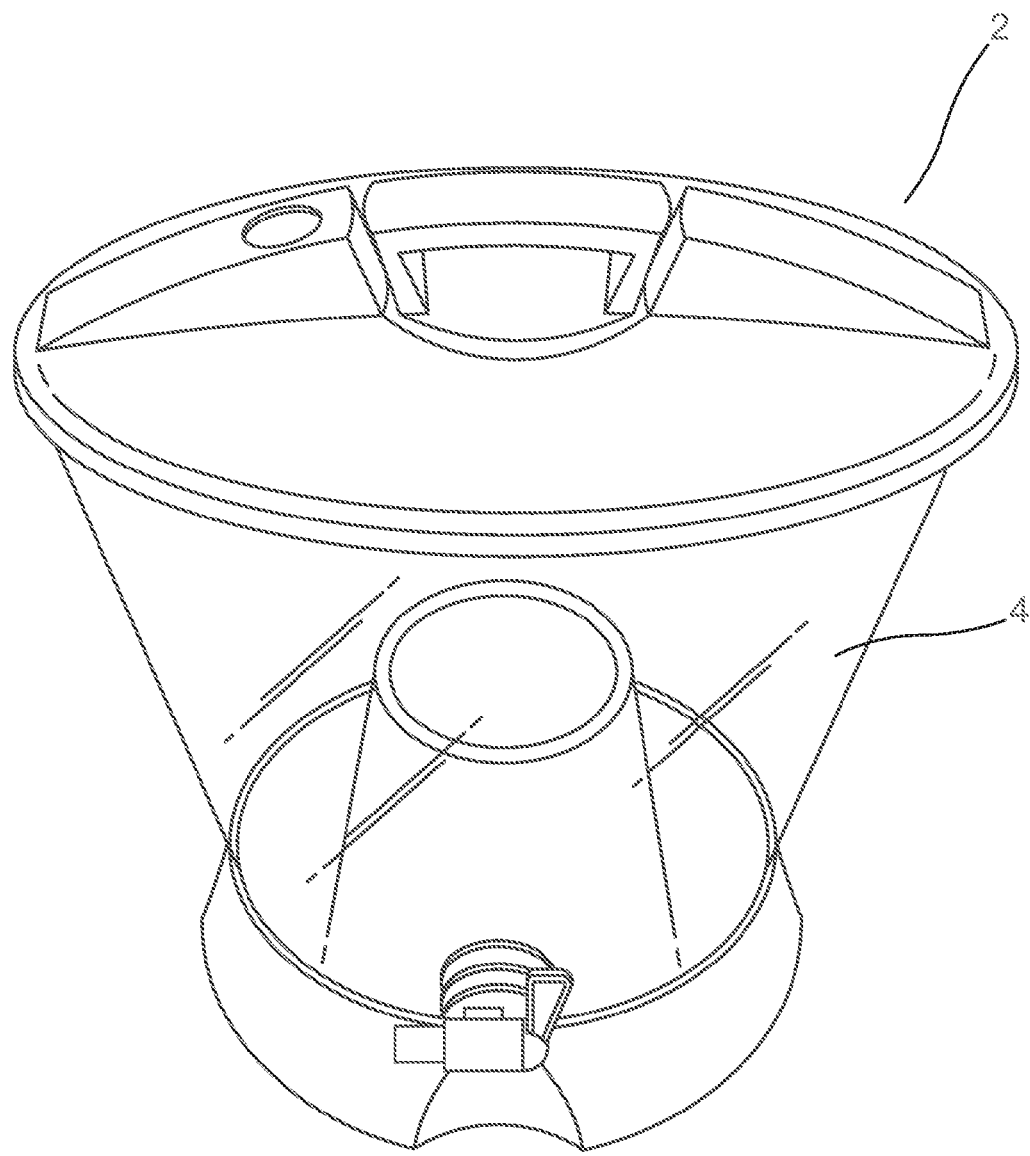
FIG. 1 is a front perspective view of a vessel incorporating an embodiment of the present invention.

In the following description, similar features in the drawings have been given identical reference numerals where appropriate. All dimensions described herein are intended solely to illustrate an embodiment. These dimensions are not intended to limit the scope of the invention that may depart from these dimensions.

FIG. 1 illustrates one contemplated use of the present invention. There is shown a wine making vessel 2 with an outer container 4 that incorporates an embodiment of a spigot assembly 8 according to the present invention. Although the assembly 8 is shown in the vessel 2, this is but one contemplated area of use and it is not meant to limit the application of the present invention.

Figure 2:
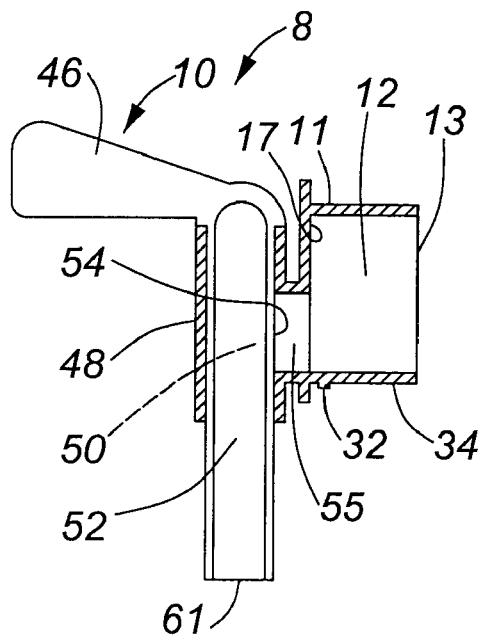
FIG. 2 is a vertical cross-section through a side of the tap and associated housing part according to one embodiment of the invention.
Figure 3:
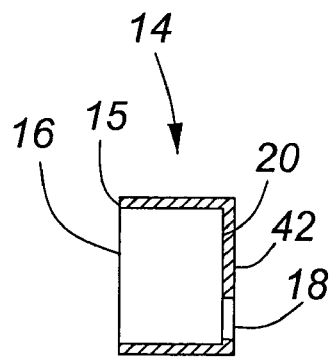
FIG. 3 is a vertical cross-section through a side of a further housing part according to the embodiment of FIG. 1.
Figure 4:
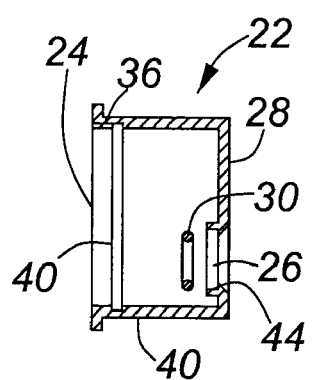
FIG. 4 is a vertical cross-section through a side of a further housing part according to the embodiment of FIG. 1.

With reference to FIGS. 2 to 4, the spigot assembly 8 comprises a tap assembly 10; a first housing part comprising cylindrical parts 11 and 14; and a second housing part comprising cylindrical part 22.

The tap assembly 10 is conventional, comprising an open-ended cylinder 48 carrying a tap 46 including a cylindrical barrel 52 open at the end 61. There may also be provided drainage means to drain any unwanted liquid form the barrel 52.

The barrel 52 is frictionally engaged in cylinder 48 in a sealing engagement.

Cylinder 48 includes an opening 54 leading via flow path 55 to cylindrical part 11.

A corresponding opening 50 is provided in barrel 52, so that when the tap 46 is rotated, the opening 50 can be moved into or out of alignment with the opening 54 in the cylinder 48 and hence the cylindrical housing part 11.

The cylindrical housing part 14 may be frictionally fitted into cylindrical housing part 11, such that end 13 of part 11 mates the wall 20 of part 14 and end 16 of part 14 mates the wall 17 of part 11.

This frictional fitting is normally intended to be a permanent joining.

Of note, cylindrical housing parts 11 and 14 could comprise a single cylindrical part. For convenience of molding, however, the housing has been broken into two parts 11 and 14 which are then frictionally fitted together.

When housing parts 11 and 14 are fitted together, a closed chamber 12 is formed having an inlet opening 18 through housing part 14 and an outlet 55, as described, into tap assembly 10.

When the housing for a chamber 12 comprises the two parts 11 and 14, the frictional joining of the two parts may also include a keyway arrangement as, for example, tongue and groove, to positively mechanically prevent relative rotation of the parts once assembled.

Housing part 11 is provided with at least one but preferably three protrusions 32 on the outside 34 of part 11.

Cylindrical housing part 22 comprises an open-ended cylinder which includes a keyway 36 corresponding to each protrusion 32 and a guideway 40 which may comprise a groove extending circumferentially about the interior of housing part 22. The keyways 36 terminate at guideway 40.

Housing part 22 also includes an opening 26 in the otherwise closed end thereof. Opening 26 includes a seat for a seal 30, shown as a sealing ring. Seal 30 is typically flattened on the side thereof facing into the cylinder. Another configuration of the seal 30 may be hemispherical, with a central aperture.

Once the parts 11 and 14 have been assembled to comprise a substantially closed housing defining the chamber 12, the tap assembly 10 and the chamber assembly can be inserted into housing part 22.

Figure 5:
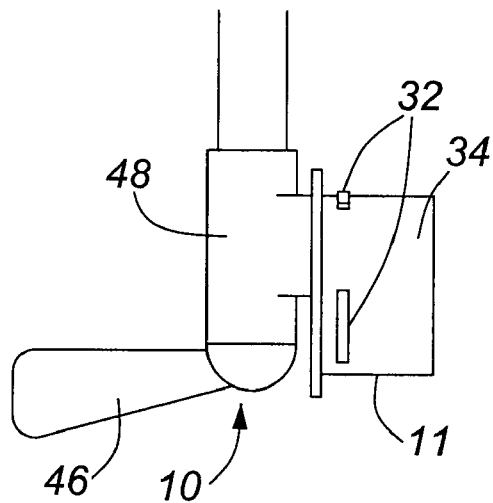
FIG. 5 is a side view of the tap and associated housing part according to the embodiment of FIG. 1.
Figure 6:
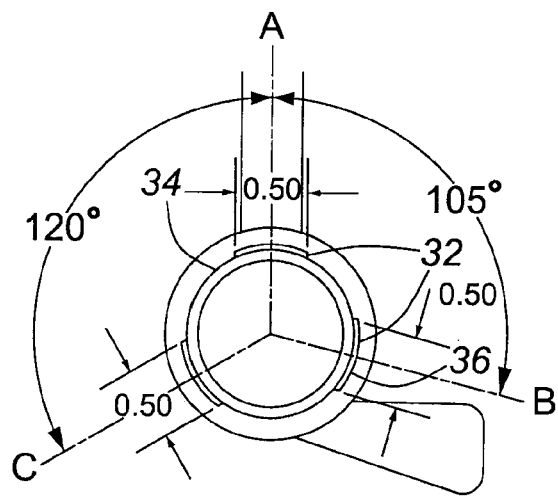
FIG. 6 is a rear view of the housing part according to FIG. 1.
Figure 7:
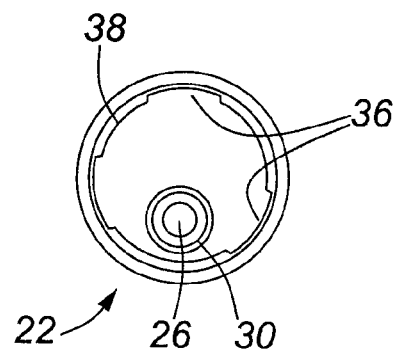
FIG. 7 is a front view of the housing part according to FIG. 3.

With particular reference to FIGS. 5 to 7, three protrusions 32 are provided on part 11. It is noted from FIG. 6 that the protrusions are unevenly spaced about cylindrical part 11 at annular distances of 105°, 120° and 135°.

The cooperating keyways 36, as shown in FIG. 7, on the part 22, are similarly offset to receive the protrusions. It will be noted that the part 14 may be fully inserted into part 11, so that there is a positive engagement between the end edge 15 of part 14 and the end wall 17 of part 11.

To assemble the remaining two parts of the spigot assembly, the tap assembly, including now joined parts 11 and 14 is turned upside down, shown in FIGS. 5 and 6, and inserted into part 22 with the protrusions 32 keying into keyways 36. When the protrusions abut against the bottom of guideway groove 40, the tap assembly may be rotated with the protrusions 32 moving along the groove 40. It will be noted with reference to FIG. 8, that when the tap assembly is upside down as in FIG. 5, the opening 18 in part 14 will be in the position 1 shown in discontinuous lines in FIG. 8. In that position the protrusions 32 have been inserted into the keyways 36 but have not been rotated in the guideway 40.

The tap assembly is then rotated 90° in the guideway 40. At this stage the tap assembly is locked into the part 22, because the protrusions 32 have been rotated out alignment with the keyways 36.

When the tap assembly and associated joined parts 11 and 14 are thus inserted into part 22, the end surface 42 of part 14 is forced against the seal 30 to put the seal 30 into compression to thus seal the opening 26 against any liquid flow.

Figure 8:
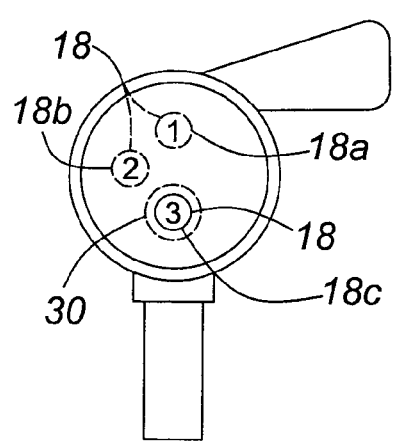
FIG. 8 is a schematic end view of the assembled spigot assembly according to FIGS. 2 to 4, illustrating the stages in assembling and activating the assembly.
Figure 9:
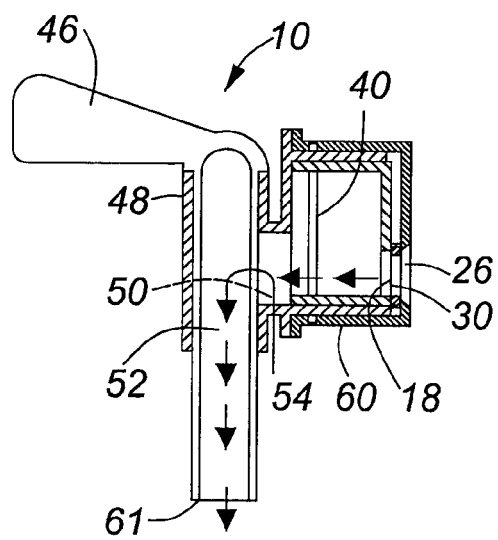
FIG. 9 is a vertical cross-section through the assembled spigot assembly.
Figure 14:
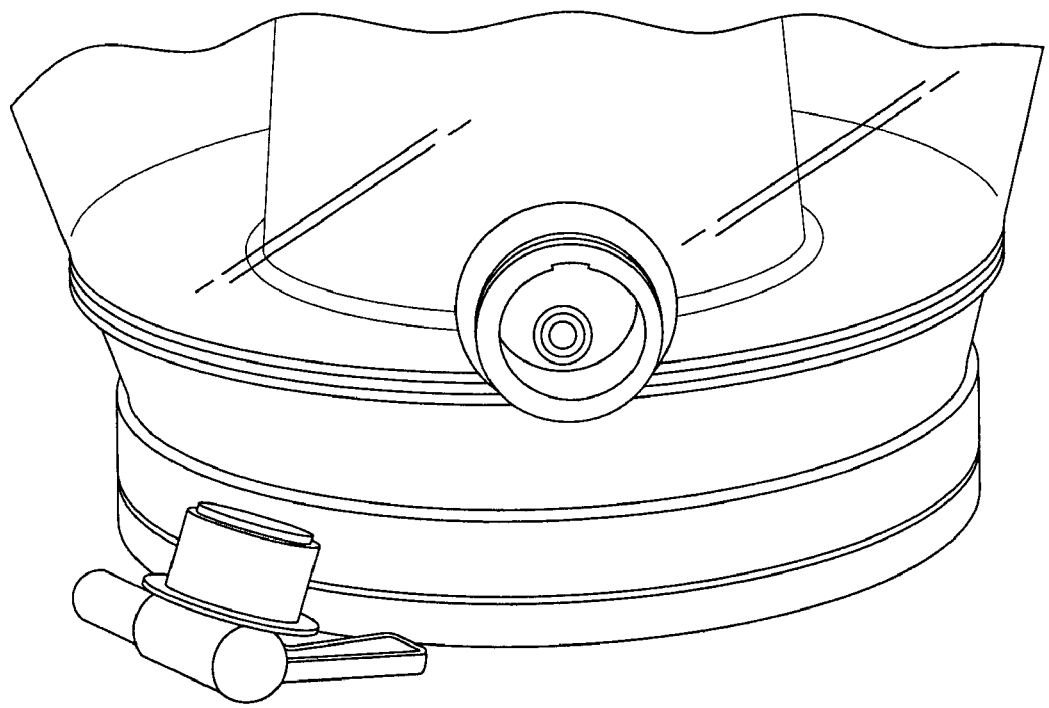
FIG. 14 is a front view of a partially assembled tap assembly, where the further housing part is affixed to a container.

Again, in the locked position with the tap assembly rotated at 90°, the opening 18 of part 14 is in the position shown in discontinuous lines as position 2 in FIG. 8. In both of positions 1 and 2, the opening 18 remains out of alignment with the opening 26, so that the compressive force remains on the seal. When the tap is rotated a further 90°, to the position shown in FIG. 8, the opening 18 is then in position 3 in FIG. 8; that is, in alignment with opening 26. At that point liquid can flow into chamber 12. Outflow from chamber 12 is then controlled by tap 46.

In use, the part 22 is preferably first secured in a suitable opening in the side of a container 4, such that the end surface 28 of part 22 is flush with the interior wall of the container 4. The interior wall of the container 4 and the part 22 thus present a substantially smooth continuous internal surface in the container.

The flush mounting thus does not present any protruding surface upon which sediment might collect and subsequently be drawn into the chamber 12 when the tap assembly is rotated to put opening 18 in alignment with opening 26.

In order to provide a proper seat for seal 30, a shallow space may of necessity be left on the surface 28 of the end wall of part 22. However, the steeply sloping edge 44 of that space strongly mitigates against any sediment being trapped in that space.

Of note, the unequal spacing of protrusions 32 about the outer surface of part 11 ensures that the protrusions will only align with the keyways 36 in the position of the tap assembly shown in FIG. 5.

In certain applications of the spigot assembly, it is preferable to reduce the amount of air initially in chamber 12. For example, where the spigot assembly is used to remove wine from a fermentation vessel 2 in which the wine has been made, it is desirable to minimize the amount of air in the chamber, in order to avoid oxidation of the wine. Accordingly, as shown in FIG. 11, a channel 68 is formed within chamber 12 by a top wall 63 and a pair of side walls 64. Only one of side walls 64 is shown in the cutaway of FIG. 11. A second chamber 65 is thus also formed.

Although the present invention has been described by way of a detailed description in which various embodiments and aspects of the invention have been described, it will be seen by one skilled in the art that the full scope of this invention is not limited to the examples presented herein. For example, the fermentation vessel may be suitable to brew any fermented liquid for consumption, including but not limited to, beer, wine or other spirit. The invention has a scope which is commensurate with the claims of this patent specification including any elements or aspects which would be seen to be equivalent to those set out in the accompanying claims.

What is claimed is:

1. A spigot assembly for mounting on a side of a container, said spigot assembly comprising:
   a. a first housing part having an inner end and an open outer end, said inner end for mounting substantially flush with an interior surface of a wall of said container, said inner end having a first inlet opening therein;
   b. a second housing part defining a chamber therein and adapted for mounting for rotation in said first housing part, said chamber having an inlet and an outlet; and
   c. a tap assembly on said outlet of said chamber;
   d. and wherein said second housing part is rotatable between a first position in which said inlet and said outlet are aligned, and a second position in which said inlet and said outlet are out of alignment.

2. The spigot assembly of claim 1 wherein a sealing means surrounds the first inlet opening.

3. The spigot assembly of claim 2 wherein the sealing means is an elastomeric flattened o-ring.

4. The spigot assembly of claim 1 wherein the second housing part further comprises:
   a. a first component having an outlet; and
   b. a second component capable of insertion into the first component and having an inlet.

5. The spigot assembly of claim 1 wherein the chamber further comprises:
   a. a wall mounted on the interior wall of the chamber above the inlet and the outlet defining a narrow chamber.

6. A method of preventing collection of sediment in a spigot assembly comprising the steps of:
   a. providing a spigot assembly having a first housing part having an inner end and an open outer end, said inner end for mounting substantially flush with an interior surface of a wall of a container, said inner end having a first inlet opening therein; a second housing part defining a chamber therein and adapted for mounting for rotation in said first housing part, said chamber having an inlet and an outlet; and a tap assembly on said outlet of said chamber and wherein said first housing part is rotatable between a first position in which said inlet and said outlet are aligned, and a second position in which said inlet and said outlet are out of alignment;
   b. rotating the first housing part to its closed position; and
   c. filling the container with a liquid containing sediment.

7. The method of claim 6 further comprising the steps of:
   a. waiting for the sediment to settle to a bottom of the container; and
   b. rotating the first housing part to its open position; and
   c. opening the tap allowing the liquid free from sediment to flow through the spigot assembly.

* * * * *